(12) United States Patent
Ohkawa et al.

(10) Patent No.: US 7,060,125 B2
(45) Date of Patent: *Jun. 13, 2006

(54) NON-AQUEOUS INK COMPOSITION

(75) Inventors: Teruaki Ohkawa, Inashiki-gun (JP); Hiroyuki Ogawa, Inashiki-gun (JP); Osamu Matsumoto, Inashiki-gun (JP); Toshihiro Endo, Inashiki-gun (JP); Yasuo Yamamoto, Inashiki-gun (JP)

(73) Assignee: Riso Kagaku Corporation, Tokyo (JP)

( * ) Notice: Subject to any disclaimer, the term of this patent is extended or adjusted under 35 U.S.C. 154(b) by 120 days.

This patent is subject to a terminal disclaimer.

(21) Appl. No.: 10/414,049

(22) Filed: Apr. 16, 2003

(65) Prior Publication Data
US 2003/0192453 A1  Oct. 16, 2003

(30) Foreign Application Priority Data
Apr. 16, 2002 (JP) ............................. 2002-112883
Jan. 10, 2003 (JP) ............................. 2003-003926

(51) Int. Cl.
*C09D 11/00* (2006.01)

(52) U.S. Cl. ............................. 106/31.57; 106/31.58; 106/31.85; 106/31.86; 106/31.88

(58) Field of Classification Search ............. 106/31.57, 106/31.58, 31.85, 31.86, 31.88
See application file for complete search history.

(56) References Cited

U.S. PATENT DOCUMENTS

| 5,663,217 A | * | 9/1997 | Kruse ......................... 523/161 |
|---|---|---|---|
| 5,723,545 A | | 3/1998 | Harrington et al. |
| 5,763,532 A | | 6/1998 | Harrington et al. |
| 5,837,787 A | | 11/1998 | Harrington |
| 5,849,814 A | * | 12/1998 | Fujita ......................... 523/161 |
| 6,121,383 A | | 9/2000 | Abdou-Sabet et al. |
| 6,203,603 B1 | * | 3/2001 | Takayama et al. ....... 106/31.16 |
| 6,402,823 B1 | * | 6/2002 | Sainz et al. .............. 106/31.95 |
| 6,503,965 B1 | * | 1/2003 | Nowak et al. .............. 523/161 |
| 2002/0112641 A1 | | 8/2002 | Naruse et al. |
| 2003/0177948 A1 | * | 9/2003 | Ohkawa et al. .......... 106/31.86 |

FOREIGN PATENT DOCUMENTS

| EP | 1 111 017 A1 | 6/2001 |
|---|---|---|
| EP | 1 344 802 A1 | 9/2003 |
| JP | 11-279467 | 10/1999 |
| JP | 2002-168227 | 6/2002 |
| WO | WO 97/15633 | 5/1997 |

OTHER PUBLICATIONS

European Search Report Dated Oct. 1, 2003.

* cited by examiner

*Primary Examiner*—Helene Klemanski
(74) *Attorney, Agent, or Firm*—Nixon Peabody LLP; Donald P. Studebaker

(57) ABSTRACT

To provide a non-aqueous ink composition which is small in generation of strike through or smear marks and free from the problem of clogging of the nozzle.

A non-aqueous ink composition includes solvent, dispersant and coloring material of pigment or dye. The solvent contains therein at least not smaller than 10% by weight non-polar organic solvent which is not higher than 260° C. in 50% running point and at least not smaller than 20% by weight polar organic solvent which is not lower than 300° C. in 50% running point.

7 Claims, No Drawings

NON-AQUEOUS INK COMPOSITION

BACKGROUND OF THE INVENTION

1. Field of the Invention

This invention relates to an ink composition for a printer, and more particularly to a non-aqueous ink composition containing therein non-volatile solvent as a main material.

2. Description of the Related Art

Ink jet recording has been rapidly put into wide use since it realizes high-speed printing with relatively less noise. In an ink jet printer, highly flowable liquid ink is injected onto a recording medium through a fine nozzle, and the ink jet printers are broadly divided into an on demand type and a continuous type.

Inks for ink jet printers are broadly divided into an aqueous type and a non-aqueous type. The aqueous type inks generally comprise water-soluble dye such as acid dye, direct dye and basic dye dissolved in glycol solvent and water, and there has been a problem that ink jet printings by an aqueous type ink are generally poor in resistance to water.

On the other hand, non-aqueous type inks are excellent in resistance to water. The non-aqueous type inks are broadly divided into solvent type inks and oil type inks. Especially, various kinds of oil type inks have been proposed since the oil type ink is advantageous as ink for high-speed ink jet printer in that it is less apt to cause clogging of the nozzle and requires less frequent cleaning during printing. See, for instance, Japanese Unexamined Patent Publication Nos. 11(1999)-279467, 2000-168227 and U.S. Laid-Open No. 20020112641 and U.S. Pat. Nos. 5,723,545, 5,763,532, 5,837,787 and 6,121,383.

However, the oil type ink gives rise to a problem that the solvent in the ink is non-volatile and remains on the printings for a long time, and the residual solvent is apt to cause strike through (the printed part can be seen through from the back side of the printings) and/or smear marks (the residual solvent component oozes out from the printed part).

The problem of strike through or smear marks may be avoided by changing the solvent in the ink to volatile solvent. However, this approach will give rise to another problem that clogging of the nozzle becomes more apt to occur since the viscosity of the ink increases due to the volatile solvent and/or the dispersant is separated out in the solvent remaining near the nozzle, whereby the pigment in the ink is agglomerated. That is, when the ink is free from non-volatile solvent which can cause strike through and/or smear marks, clogging of the nozzle becomes more apt to occur, whereas when the ink contains non-volatile solvent, strike through and/or smear marks becomes more apt to occur though the problem of clogging of the nozzle can be avoided. In order to overcome both the problem of strike through and/or smear marks and the problem of clogging of the nozzle, the ink must have conflicting nature.

SUMMARY OF THE INVENTION

In view of the foregoing observations and description, the primary object of the present invention is to provide a non-aqueous ink composition which can overcome both the problem of strike through and/or smear marks and the problem of clogging of the nozzle.

In accordance with the present invention, there is provided a non-aqueous ink composition comprising solvent, dispersant and coloring material (pigment or dye), wherein the solvent contains therein not smaller than 10% by weight non-polar organic solvent which is not higher than 280° C. in 50% running point and not smaller than 20% by weight polar organic solvent which is not lower than 300° C. in 50% running point.

The "50% running point" is measured according to JIS K0066 "Distillation Test of Chemical Products" and means temperature at which 50% by weight of the solvent is evaporated. The solvent may contain non-polar organic solvent which is higher than 280° C. in 50% running point and polar organic solvent which is lower than 300° C. in 50% running point so long as it contains the non-polar organic solvent which is not higher than 280° C. in 50% running point in an amount not smaller than 10% by weight and the polar organic solvent which is not lower than 300° C. in 50% running point in an amount not smaller than 20% by weight.

It is preferred that the solvent contains the non-polar organic solvent which is not higher than 280° C. in 50% running point in an amount not smaller than 20% by weight. It is preferred that the non-polar organic solvent is selected from the group consisting of aliphatic hydrocarbon solvents, alicyclic hydrocarbon solvents and aromatic hydrocarbon solvents.

It is preferred that the polar organic solvent contains not smaller than 10% by weight ester solvent not lower than 300° C. in 50% running point and the dispersant has ester structure. It is preferred that the dispersant having ester structure is dispersant having polyester amine structure or fatty acid amine structure.

Preferably, the solvent of the non-aqueous ink composition of the present invention contains the polar organic solvent, including the polar organic solvent which is not lower than 300° C. in 50% running point, in an amount not smaller than 60% by weight and the polar organic solvent contains not smaller than 10% by weight ester solvent.

Strike through and smear marks are more apt to be generated as the solvent in the ink composition is less volatile. In the ink composition of the present invention, since not smaller than 10% by weight of the total solvent is non-polar organic solvent which is not higher than 280° C. in 50% running point, the solvent component is rapidly evaporated from the ink composition deposited on the printings and strike through and smear marks are less apt to be generated. Further, when volatile solvent is polar, the ink composition generally smells strong. However, the ink composition of the present invention less smells since the organic solvent which is not higher than 280° C. in 50% running point and volatile is non-polar.

Clogging of the nozzle generated when the nozzle is left to stand in an open system is more apt to occur as the solvent component of the ink composition is more volatile. However, in the ink composition of the present invention, since not smaller than 20% by weight of the total solvent is the polar organic solvent which is not lower than 300° C. in 50% running point, clogging of the nozzle is less apt to occur.

Dispersant is generally more readily dissolved in polar organic solvent than in non-polar solvent. In the non-aqueous ink composition of the present invention, since dispersant can be stably dissolved in the polar organic solvent which is not lower than 300° C. in 50% running point even if the non-polar organic solvent which is not higher than 280° C. in 50% running point is evaporated near the nozzle, agglomeration of pigment particles can be effectively suppressed and discharge of the ink is stabilized, whereby a problem of loss of part of the image, blur of the image or insufficient image density can be overcome.

Since dispersant having ester structure is especially readily dissolved in ester solvent, when the polar organic solvent is ester solvent not lower than 300° C. in 50% running point and the dispersant has ester structure, agglomeration of pigment particles is further suppressed and non-aqueous ink excellent in shelf stability where viscosity of the ink and/or size of the ink particles hardly changes after storage at high temperature can be obtained. Accordingly, discharging conditions hardly change even if the ink is used after long storage, and images obtained can be stabilized.

Further, when the solvent of the non-aqueous ink composition of the present invention contains the polar organic solvent in an amount not smaller than 60% by weight of the total solvent and the polar organic solvent contains not smaller than 10% by weight ester solvent, dispersant can be more stably dissolved in the ink composition, and agglomeration of pigment particles is further suppressed. Especially, when the solvent of the ink composition contains not smaller than 60% by weight polar organic solvent, blur of an image on plain paper can be effectively suppressed. This is probably because plain paper has been sized (hydrophobic treatment) in order to prevent blur when written with an aqueous utensil such as an aqueous ball point pen or an aqueous fountain pen, and ink containing a polar (hydrophilic) component is more advantageous than ink containing a non-polar (hydrophobic) component (e.g., aliphatic solvent) in suppressing blur or strike through.

DETAILED DESCRIPTION OF THE INVENTION

In accordance with the present invention, there is provided a non-aqueous ink composition comprising non-polar organic solvent which is not higher than 280° C. in 50% running point (will be referred to simply as "running point", hereinbelow), polar organic solvent which is not lower than 300° C. in running point, dispersant and coloring material (pigment or dye).

The non-polar organic solvent employed in the non-aqueous ink composition of the present invention contains non-polar organic solvent which is not higher than 280° C. in running point in an amount not smaller than 10% by weight of the total solvent and preferably in an amount not smaller than 20% by weight. When the non-polar organic solvent which is not higher than 280° C. in running point is in an amount smaller than 10% by weight of the total solvent, the solvent remains on the printings for a long time, and it becomes difficult to suppress strike through and/or smear marks.

As the non-polar solvent, aliphatic hydrocarbon solvents, alicyclic hydrocarbon solvents and aromatic hydrocarbon solvents are preferred. As the aliphatic hydrocarbon solvents and alicyclic hydrocarbon solvents, for instance, Teclen N-16, Teclen N-20, Teclen N-22, Nisseki Naphthesol L, Nisseki Naphthesol M, Nisseki Naphthesol H, #0 Solvent L, #0 Solvent M, #0 Solvent H. Nisseki Isosol 300, Nisseki Isosol 400, AF-4, AF-5, AF-6 and AF-7 which are available from NIPPON OIL CORPORATION, and Isopar G, Isopar H, Isopar L, Isopar M, Exxo1D40, Exxo1D80, Exxo1D100, Exxo1D130 and Exxo1D140 which are available from Exxon may be suitably employed. As the aromatic solvent, for instance, Nisseki Leansol G (alkylbenzene) maybe suitably employed. As the non-polar solvents not higher than 280° C. in running point, AF-4, AF-7, Nisseki Naphthesol M, Nisseki Naphthesol L, Teclen N-16, Teclen N-20, Teclen N-22, #0 Solvent L, #0 Solvent M, #0 Solvent H, Nisseki Isosol 300, Nisseki Isosol 400 and Nisseki Leansol G which are available from NIPPON OIL CORPORATION, and Exxo1D80, solvesso 200, Isopar M and Isopar L which are available from Exxon may be suitably employed.

The non-polar organic solvents listed above may be employed either alone or as a mixture of two or more of them.

The polar organic solvent employed in the non-aqueous ink composition of the present invention contains polar organic solvent which is not lower than 300° C. in running point in an amount not smaller than 20% by weight of the total solvent and preferably in an amount not smaller than 50% by weight. When the polar organic solvent which is not lower than 300° C. in running point is in an amount smaller than 20% by weight of the total solvent, agglomeration of pigment particles is apt to occur and clogging of the nozzle is apt to occur. In this case, it is preferred that the total amount of the polar organic solvent, including the polar organic solvent which is not lower than 300° C. in running point, be not smaller than 60% by weight of the total solvent and at least 10% of the polar solvent be ester solvent (need not be not lower than 300° C. in running point).

As the polar organic solvent, ester solvent, alcohol solvent, higher fatty acid solvent, ether solvent and a mixture of these solvents may be used. It is preferred that the polar organic solvent forms a single phase when mixed with solvent other than polar organic solvent.

For example, ester solvents such as methyl laurate, isopropyl laurate, isopropyl myristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, di-isopropyl adipate, di-isopropyl sebacate, diethyl sebacate, propylene glycol monocaprate, trimethylolpropane tri-2-ethylhexanoate and glyceryl tri-2-ethylhexanoate; alcohol solvents such as isomyristyl alcohol, isopalmityl alcohol, isostearyl alcohol and oleyl alcohol; higher fatty acid solvents such as isononanoic acid, isomyristic acid, hexadecanoic acid, isopalmitic acid, oleic acid and isostearic acid; and ether solvents such as diethylene glycol monobutyl ether, ethylene glycol monobutyl ether, propylene glycol monobutyl ether, and propylene glycol dibutyl ether can be suitably employed.

As the polar organic solvent not lower than 300° C. in running point, methyl soybean oil, isobutyl soybean oil, ethyl oleate, isostearyl alcohol, oleyl alcohol, isopalmitic acid, isostearic acid, isoarachic aid, isohexacosanoic acid, isopropyl isostearate, methyl linoleate, isobutyl linoleate, and isobutyl tallate can be suitably employed.

The polar organic solvents listed above may be employed either alone or as a mixture of two or more of them.

As the dispersant, hydroxyl-group-containing carboxylate esters, salts of long-chain polyamino-amide and polymeric acid ester, salts of polymeric polycarboxylic acid, salts of long-chain polyamino-amide and polar acid ester, polymeric unsaturated acid ester, polymeric copolymer, denatured polyurethane, denatured polyacrylate, polyether-ester type anionic surface active agent, salts of formalin naphthalenesulfonate condensate, salts of formalin aromatic sulfonate condensate, polyoxyethylene alkylphosphoric acid ester, polyoxyethylene nonylphenyl ether, polyester polyamine, stearylamine acetate and the like may be used.

For example, "Anti-Terra-U" (polyamino-amide phosphate), "Anti-Terra-203/204" (polymeric polycarboxylate), "Disperbyk-101" (polyamino-amide phosphate and acid ester), "Disperbyk-107" (hydroxyl-group-containing carboxylate ester), "Disperbyk-110" (acid-radial-containing copolymer), "Disperbyk-130" (ployamide), "Disperbyk- 161", "Disperbyk-162", "Disperbyk-163" "Disperbyk-164", "Disperbyk-165", "Disperbyk-166", "Disperbyk-170" (polymeric copolymer), "Disperbyk-400", "Bykumen" (polymeric unsaturated acid ester), "BYK-P104/P105" (polymeric unsaturated acid polycarboxylic acid), "BYK-P104S/240S" (polymeric unsaturated acid polycarboxylic acid and silicone), and "Lactimon" (long-chain amine, unsaturated acid polycarboxylic acid and silicone) which are available from BYK Chemie may be employed.

Further, "Efka 44", "Efka 46", "Efka 47", "Efka 48", "Efka 49", "Efka 54", "Efka 63", "Efka 64", "Efka 65", "Efka 66", "Efka 71", "Efka 701", "Efka 764", "Efka 766", "Efka Polymer 100" (denatured polyacrylate), "Efka Polymer 150" (denatured aliphatic polymer), "Efka Polymer 400", "Efka Polymer 401", "Efka Polymer 402", "Efka Polymer 403", "Efka Polymer 450", "Efka Polymer 451", "Efka Polymer 452", "Efka Polymer 453" (denatured polyacrylate), and "Efka Polymer 745" (copper phthalocyanine), which are available from EfkaCHEMICALS; "FlowrenTG-710" (urethane oligomer), "FlowrenDOPA-15B", (acryl oligomer), "FlowrenSH-290/SP1000", "Polyflow No. 50E", and "Polyflow No. 300" (acryl copolymer), which are available from Kyoei Kagaku; and "Disperlon KS-860", "Disperlon KS-873N", "Disperlon KS-874" (polymeric dispersant), #2150 (aliphatic polycarboxylic acid), "#7004" (polyether ester type), and "DA-703-50" (polyester acid amide-amine salt), which are available from Kusumoto Kasei, may be employed.

Further, "DEMOL RN", "DEMOL N" (sodium salt of formalin naphthalenesulfonate condensate), "DEMOL MS.C", "DEMOL SN-B" (sodium salt of formalin aromatic sulfonate condensate), "DEMOL EP", "HOMOGENOL L-18" (polycarboxylic acid type polymer), "EMULGEN 920", "EMULGEN 930", "EMULGEN 931", "EMULGEN 935", "EMULGEN 950", "EMULGEN 985" (polyoxyethylene nonylphenyl ether), "Acetamine 24" (coconutamine acetate), and "Acetamine 86" (stearylamine acetate), which are available from Kao Corporation, "Solsperse 5000" (phthalocyanine ammonium), "Solsperse 13940" (polyester amine), "Solsperse 17000", "Solsperse 18000" (fatty acid amine), "Solsperse 22000", "Solsperse 24000", and "Solsperse 28000", which are available from AVECIA, and "Nikkol T-106" (polyoxyethylene sorbitanmonooleate), "MYS-IEX" (polyoxyethylene monostearate) and "Hexagline 4-0)" (hexaglyceryl tetraoleate), which are available from Nikko Chemical, may be employed.

Among combinations of these solvents and dispersants, combinations of ester solvents not lower than 300° C. in running point and dispersants having ester structure (especially, dispersants having polyesteramine structure or fatty acid amine structure) are especially advantageous in that more stable dispersion can be obtained, that is, the pigment is finer particle size and the ink is small in particle size change and/or viscosity change when left to stand under high temperature. Though the ester solvent is generally contained in an amount not smaller than 10% by weight of the polar organic solvent, it should be contained preferably in an amount not smaller than 30% by weight of the polar organic solvent, and more preferably in an amount not smaller than 50% by weight of the polar organic solvent in order to improve dispersion of the pigment in ink.

As the pigment (coloring material), any of those known in the field of printing may be used irrespective of whether it is inorganic or organic. For example, carbon black, cadmium red, molybdenum red, chromium yellow, cadmium yellow, titanium yellow, chromium oxide, pirigian, cobalt green, ultramarine blue, Prussian blue, cobalt blue, azo-pigments, phthalocyanine pigments, quinacridone pigments, isoindolinone pigments, dioxazine pigments, vat pigments, perylene pigments, perinone pigments, thioindigo pigments, quinophthalon pigments and metal complex pigments may be employed.

As the dye (coloring material), oil-soluble dyes such as azo dyes, metal complex dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes, and metal phthalocyanine dyes are preferred.

The pigment and the dye may be used either alone or in suitable combinations but it is preferred that the pigment and the dye be contained from 0.01 to 20% by weight of the total ink composition.

The ink composition of the present invention may be added with resin soluble to the aforesaid polar organic solvent in order to improve fixing of ink to a recording medium and/or to adjust spread of ink on a recording medium. For example, acrylic resins, styrene-acrylic resins, styrene-maleic resins, rosin resins, rosin ester resins, ethylene-vinyl acetate resins, petroleum resins, coumarone-indene resins, terpene phenol resins, phenol resins, urethane resins, melamine resins, urea resins, epoxy resins, cellulose resins, vinyl chloride acetate resins, xylene resins, alkyd resins, aliphatic resins, butyral resins, maleic resins and fumaric resins may be employed.

The present invention will be described in more detail with reference to embodiments, hereinbelow.

EMBODIMENT 1 (EMB 1)

13 parts by weight of methyl soybean oil, 20 parts by weight of isobutyl soybean oil, 10 parts by weight of ethyl oleate, 10 parts by weight of isostearyl alcohol, 17 parts by weight of naphthenic solvent (Nisseki AF-4)and 15 parts by weight of naphthenic solvent (Nisseki AF-6) were mixed and 5 parts by weight of Solsperse 13940 (AVECIA) was dissolved in the mixture as dispersant. Then 5 parts by weight of carbon black (MA-8) was added to the resultant mixture and premixed. Then the resultant mixture was dispersed by bead mill with residence time of about 20 minutes, thereby obtaining ink.

EMBODIMENTS 2 to 7 (EMB 2~EMB 7)

Inks were obtained in the same manner as the embodiment 1 except that pigment, polar organic solvent, non-polar solvent and dispersant shown in the following table 1 were employed.

Comparative Examples 1 to 8 (ce 1~8)

Inks were obtained in the same manner as the embodiment 1 except that pigment, polar organic solvent, non-polar solvent and dispersant shown in the following table 2 were employed.

(Evaluation)

<Smear Marks>

A solid square of 2 cm×2 cm were printed on plain paper (Riso thick type S: Riso Kagaku Corporation), and the distance between the outer edge of the smear mark to a side of the square were measured at random ten points after the solid square was left to stand for 24 hours. Then smear marks were evaluated as follows on the basis of the average distance.
○: average distance was smaller than 1 mm.
Δ: average distance was not smaller than 1 mm and smaller than 5 mm.
X: average distance was not smaller than 5 mm.

<Strike Through>

The back side of the solid square used in evaluation of smear marks was measured by the use of an OD meter (Macbeth) and strike through was evaluated as follows.
○: OD was smaller than 0.15.
Δ: OD was not smaller than 0.15 and smaller than 0.3.
X: OD was not smaller than 0.3.

<Clogging>

Whether the ink was regularly discharged from the ink jet head in was evaluated as follows after the ink jet head was left to stand for 6 hours after printing.
○: Ink was regularly discharged from all the nozzles.
Δ: The number of nozzles from which ink was not discharged was smaller than the total number of the nozzles.
X: The number of nozzles from which ink was not discharged was not smaller than the total number of the nozzles.

<Shelf Stability>

Ink was left to stand in a sealed container for 6 months under 70° C., and thereafter the shelf stability was evaluated as follows on the basis of the measured values of changes of particle size and viscosity of the ink. The particle size of the ink was measured by the use of a Dynamic Light Scattering Particle Size Distribution LB-500 (Horiba Seisakusho), and the viscosity of the ink was measured by the use of HAAKE rheometer RS75.
◎: The rates of change of mean particle size and viscosity of the ink were both smaller than 5%.
○: The rate of change of mean particle size or viscosity of the ink were not smaller than 5% and smaller than 10%.
Δ: The rate of change of mean particle size or viscosity of the ink were not smaller than 10% and smaller than 20%.
x: The rate of change of mean particle size or viscosity of the ink were not smaller than 20%.

<Smell>

Ink which did not smell bad was evaluated as ○ and ink which smelled bad was evaluated as X.

The result was shown in the following table 3 together with the proportion (% by weight) of the non-polar organic solvent not higher than 280° C. in running point to the total solvent, the proportion (% by weight) of the polar organic solvent not lower than 300° C. in running point to the total solvent, the proportion (% by weight) of the polar organic solvent to the total solvent and the proportion (% by weight) of the ester solvent to the total solvent.

TABLE 1

|  | running point (° C.) | emb. 1 | emb 2 | emb 3 | emb 4 | emb 5 | emb 6 | emb. 7 |
|---|---|---|---|---|---|---|---|---|
| pigment |  |  |  |  |  |  |  |  |
| carbon black (MA-8) | — | 10.0 | 10.0 | 10.0 | 10.0 | 10.0 | 10.0 | 10.0 |
| non-polar organic solvent |  |  |  |  |  |  |  |  |
| AF-4 (naphthenic solvent) | 257.5 | 17.0 |  | 45.0 | 20.0 | 12.0 |  |  |
| AF-6 (naphthenic solvent) | 315.5 | 15.0 | 15.0 | 15.0 |  | 5.0 |  | 5.0 |
| AF-7 (naphthenic solvent) | 278.0 |  |  |  |  |  |  | 15.0 |
| Isosol 400 (isoparaffin solvent) | 253.5 |  | 10.5 |  |  |  | 20.0 |  |
| ExxolD80 (aliphatic hydrocarbon solvent) | 224.0 |  |  | 5.0 |  | 16.3 |  |  |
| polar solvent |  |  |  |  |  |  |  |  |
| soybean oil methyl (ester solvent) | 345.0 | 13.0 |  | 5.0 | 10.0 | 16.0 | 55.0 | 14.0 |
| soybean oil isobutyl (ester solvent) | 356.5 | 20.0 | 34.5 |  | 45.0 | 13.0 |  | 15.0 |
| ethyl oleate (ester solvent) | 344.5 | 10.0 | 15.0 |  |  |  |  |  |
| diethylene glycol monobutyl ether | 231.0 |  |  |  |  |  |  | 20.0 |
| oleyl alcohol | 342.5 | 10.0 |  | 15.0 |  | 15.0 | 10.0 |  |
| isostearyl alcohol | 301.0 |  | 10.0 |  | 10.0 | 7.7 |  | 16.0 |
| dispersant |  |  |  |  |  |  |  |  |
| Solsperse 13940 | — | 5.0 | 5.0 | 5.0 |  |  | 5.0 | 3.0 |
| Solsperse 18000 | — |  |  |  | 5.0 | 5.0 |  | 2.0 |
| total |  | 100.0 | 100.0 | 100.0 | 100.0 | 100.0 | 100.0 | 100.0 |

TABLE 2

| | running point (° C.) | ce. 1 | ce. 2 | ce. 3 | ce. 4 | ce. 5 | ce. 6 | ce. 7 |
|---|---|---|---|---|---|---|---|---|
| pigment | | | | | | | | |
| carbon black (MA-8) | — | 10 | 10 | 10 | 10 | 10 | 10 | 10 |
| non-polar organic solvent | | | | | | | | |
| AF-4 (naphthenic solvent) | 257.5 | | 7 | | | 10 | 14 | 4 |
| AF-6 (naphthenic solvent) | 315.5 | 20 | 10 | 30 | 39 | 49.5 | 35 | 60 |
| Isosol 400 (isoparaffin solvent) | 253.5 | | | 12 | | | 10 | |
| ExxolD80 (aliphatic hydrocarbon solvent) | 224.0 | | | | 14 | | | |
| polar solvent | | | | | | | | |
| soybean oil methyl (ester solvent) | 345.0 | | 55 | | 2 | | 1 | |
| soybean oil isobutyl (ester solvent) | 356.5 | 55 | | | | 2.2 | | |
| ethyl oleate (ester solvent) | 344.5 | | | | | | | 11 |
| diethylene glycol monobutyl ether | 231.0 | | | 43 | 30 | 11 | 20 | |
| oleyl alcohol | 342.5 | | | | | 12.3 | 5 | 10 |
| isostearyl alcohol | 301.0 | 10 | 13 | | | | | |
| dispersant | | | | | | | | |
| Solsperse 13940 | — | 5 | | 5 | | 5 | | |
| Solsperse 18000 | — | | 5 | | 5 | | 5 | |
| Kao: EMULGEN920 | — | | | | | | | 5 |
| (polyoxyethylene nonylphenyl | | | | | | | | |
| total | | 100 | 100 | 100 | 100 | 100 | 100 | 100 |

TABLE 3

| proportion (% by weight) | embodiment | | | | | | | comparative example | | | | | | |
|---|---|---|---|---|---|---|---|---|---|---|---|---|---|---|
| | 1 | 2 | 3 | 4 | 5 | 6 | 7 | 1 | 2 | 3 | 4 | 5 | 6 | 7 |
| non-polar organic solvent not higher than 280° C. in running point (to the total solvent) | 20.0 | 12.4 | 58.8 | 23.5 | 33.3 | 23.5 | 17.6 | 0.0 | 8.2 | 74.1 | 16.5 | 11.8 | 28.2 | 4.7 |
| polar organic solvent not lower than 300° C. in running point (to the total solvent) | 62.4 | 70.0 | 23.5 | 76.5 | 60.8 | 76.5 | 52.9 | 76.5 | 80.0 | 0.0 | 2.4 | 17.1 | 7.1 | 24.7 |
| polar organic solvent (to the total solvent) | 62.4 | 70.0 | 23.5 | 76.5 | 60.8 | 76.5 | 76.5 | 76.5 | 80.0 | 50.6 | 37.6 | 30.0 | 30.6 | 24.7 |
| ester solvent (to the total polar organic solvent) | 81.1 | 83.2 | 25.0 | 84.6 | 56.1 | 84.6 | 44.6 | 84.6 | 80.9 | 0.0 | 6.3 | 8.6 | 3.8 | 52.4 |
| evaluation | | | | | | | | | | | | | | |
| Smear marks | ○ | ○ | ○ | ○ | ○ | ○ | ○ | X | Δ | ○ | ○ | ○ | ○ | X |
| Strike through | ○ | ○ | ○ | ○ | ○ | ○ | ○ | Δ | Δ | ○ | ○ | ○ | Δ | X |
| Clogging | ○ | ○ | ○ | ○ | ○ | ○ | ○ | ○ | ○ | X | X | X | X | ○ |
| Shelf stability | ⊚ | ⊚ | Δ | ⊚ | ⊚ | ⊚ | ⊚ | ⊚ | ⊚ | Δ | X | X | X | X |
| smell | ○ | ○ | ○ | ○ | ○ | ○ | ○ | ○ | ○ | X | X | X | X | ○ |

In the case of inks in accordance with the first and second comparative examples, containing polar organic solvent not lower than 300° C. in running point in an amount not smaller than 20% by weight and non-polar organic solvent not higher than 280° C. in running point in an amount smaller than 10% by weight, solvent component was hard to evaporate from the ink deposited on the paper, strike through and smear marks are remarkably generated though clogging and shelf stability were good. In the case of ink in accordance with the seventh comparative example, containing polar organic solvent in an amount 24.7% by weight, which was smaller as compared with the first and second comparative examples, also the shelf stability was worse as compared with the first and second comparative examples. In the case of inks in accordance with the third to sixth comparative examples, containing polar organic solvent not lower than 300° C. in running point in an amount smaller than 20% by weight and non-polar organic solvent not higher than 280° C. in running point in an amount not smaller than 10% by weight, clogging and shelf stability were deteriorated though generation of strike through and smear marks was suppressed. Further, the polar organic solvent which were low in running point and were contained in a relatively high proportion also deteriorated evaluation on smell.

Whereas in the case of the inks in accordance with the first to seventh embodiments, containing non-polar organic solvent not higher than 280° C. in running point in an amount not smaller than 10% by weight of the total solvent and polar organic solvent not lower than 300° C. in running point in an amount not smaller than 20% by weight of the total solvent, strike through and smear marks were suppressed and clogging of the nozzle was suppressed. In the case of the third embodiment, containing organic solvent in an amount of only 23.5% by weight of the total solvent, the shelf stability was slightly deteriorated.

As can be understood from description above, in the non-aqueous ink composition of the present invention where not smaller than 10% by weight of the total solvent is non-polar organic solvent which is not higher than 280° C. in 50% running point, the solvent component is rapidly evaporated from the ink composition deposited on the printings and strike through and smear marks are less apt to be generated. Further the ink composition of the present invention less smells since volatile organic solvent is non-polar. Further, in the ink composition of the present invention, since not smaller than 20% by weight of the total solvent is the polar organic solvent which is not lower than 300° C. in 50% running point, clogging of the nozzle is less apt to occur. Further, in the non-aqueous ink composition of the present invention, since dispersant can be stably dissolved in the polar organic solvent which is not lower than 300° C. in 50% running point even if the non-polar organic solvent which is not higher than 280° C. in 50% running point is evaporated near the nozzle, agglomeration of pigment particles can be effectively suppressed and discharge of the ink is stabilized, whereby a problem of loss of part of the image, blur of the image or insufficient image density can be overcome.

Accordingly, the non-aqueous ink composition of the present invention can be suitably employed as ink for stencil printing, where a stencil master comprising a porous resin film is formed on one side of a porous support sheet is used and pores of the resin film of a part corresponding to the non-image part are selectively closed not to transmit ink or stencil printing, where fine porous stencil master of non-elastic film is employed (see, for instance, Japanese Unexamined Patent Publication No. 2002-2140, and can suppress smear marks and strike through and at the same time can suppress clogging of the stencil master after left to stand for a long time.

What is claimed is:

1. A non-aqueous ink, composition, comprising:
a dispersant;
a coloring material; and
a solvent mixture, comprising:
a polar organic solvent mixture being not smaller than 60% by weight based on the total weight of the solvent mixture, wherein the polar organic solvent mixture comprises at least one polar organic solvent having a 50% running point of not lower than 300° C. in an amount being not smaller than 20% of the solvent mixture; and
at least one non-polar organic solvent being not smaller than 10% by weight based on the total weight of the solvent mixture and having a 50% running point of not higher than 280° C.

2. A non-aqueous ink composition as defined in claim 1, wherein the at least one non-polar organic solvent is in an amount not smaller than 20% by weight based on the total weight of the solvent mixture.

3. A non-aqueous ink composition as defined in claim 1, wherein the at least one non-polar organic solvent is selected from the group consisting of aliphatic hydrocarbon solvents, alicyclic hydrocarbon solvents and aromatic hydrocarbon solvents.

4. A non-aqueous ink composition as defined in claim 1, wherein the at least one polar organic solvent contains not smaller than 10% by weight ester solvent having a 50% running point not lower than 300° C., and wherein the dispersant has ester structure.

5. A non-aqueous ink composition as defined in claim 4, wherein the dispersant has a polyester amine structure.

6. A non-aqueous ink composition as defined in claim 4, wherein the dispersant is has a fatty acid amine structure.

7. A non-aqueous ink composition as defined in claim 1, wherein the at least one polar organic solvent contains not smaller than 10% by weight ester solvent.

* * * * *